(12) United States Patent
Ayotte

(10) Patent No.: US 9,860,664 B1
(45) Date of Patent: Jan. 2, 2018

(54) SYSTEM FOR DYNAMICALLY ADAPTING CALIBRATED MULTI-CHANNEL NON-COHERENT SIGNALS

(71) Applicant: CAE INC., Saint-Laurent (CA)

(72) Inventor: Maxime Ayotte, Saint-Laurent (CA)

(73) Assignee: CAE INC., Saint Laurent (CA)

( * ) Notice: Subject to any disclaimer, the term of this patent is extended or adjusted under 35 U.S.C. 154(b) by 0 days.

(21) Appl. No.: 15/442,301

(22) Filed: Feb. 24, 2017

(30) Foreign Application Priority Data

Feb. 24, 2017 (CA) ..................................... 2958955

(51) Int. Cl.
| | | |
|---|---|---|
| *H04S 7/00* | (2006.01) | |
| *G09B 9/22* | (2006.01) | |
| *H04R 5/02* | (2006.01) | |
| *H04S 3/00* | (2006.01) | |
| *H04R 5/04* | (2006.01) | |

(52) U.S. Cl.
CPC ................ *H04S 7/301* (2013.01); *G09B 9/22* (2013.01); *H04R 5/02* (2013.01); *H04R 5/04* (2013.01); *H04S 3/008* (2013.01); *H04S 2400/13* (2013.01)

(58) Field of Classification Search
None
See application file for complete search history.

(56) References Cited

U.S. PATENT DOCUMENTS

| 4,781,594 A | 11/1988 | Metcalf | |
|---|---|---|---|
| 5,802,187 A | 9/1998 | Hsu | |
| 2008/0285775 A1* | 11/2008 | Christoph | H03G 3/32 381/99 |

* cited by examiner

*Primary Examiner* — Maria El-Zoobi
*Assistant Examiner* — Kenny Truong
(74) *Attorney, Agent, or Firm* — IP Delta Plus Inc.

(57) ABSTRACT

A system for dynamically adapting calibrated multi-channel non-coherent signals. The system comprises a physical simulation environment, a plurality of synthesizers for generating a corresponding plurality of signals, a plurality of filters for band-pass filtering the plurality of generated signals, and a plurality of loudspeakers positioned on a wall of the physical simulation environment for playing the plurality of filtered signals inside the physical simulation environment. The system comprises a noise sensor positioned inside the physical simulation environment for measuring a physical simulation environment signal amplitude and transmitting the physical simulation environment signal amplitude to a channel configurator. The system comprises the channel configurator for configuring each synthesizer to generate the corresponding signal according to a calibrated amplitude spectrum of the signal. The calibrated amplitude spectrum is determined based on a reference amplitude spectrum of the signal and an adjusted global signal amplitude. The adjusted global signal amplitude is calculated based on a target global signal amplitude and the physical simulation environment signal amplitude.

7 Claims, 21 Drawing Sheets

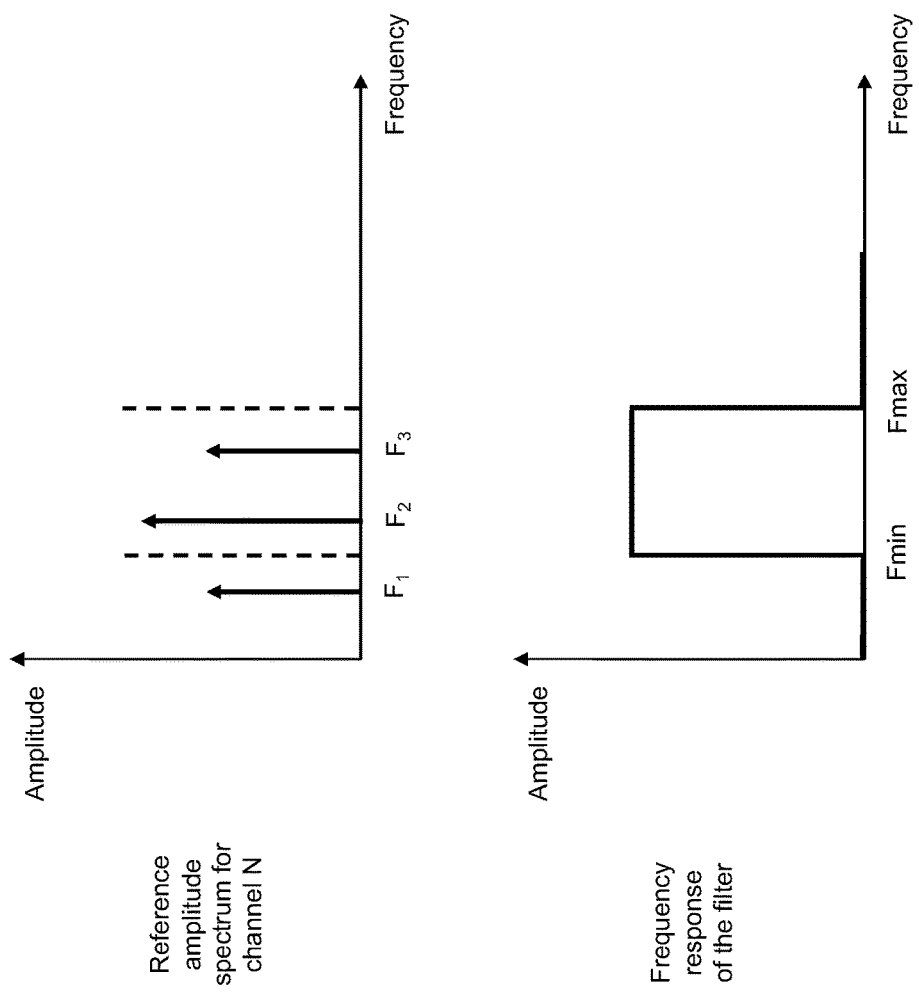

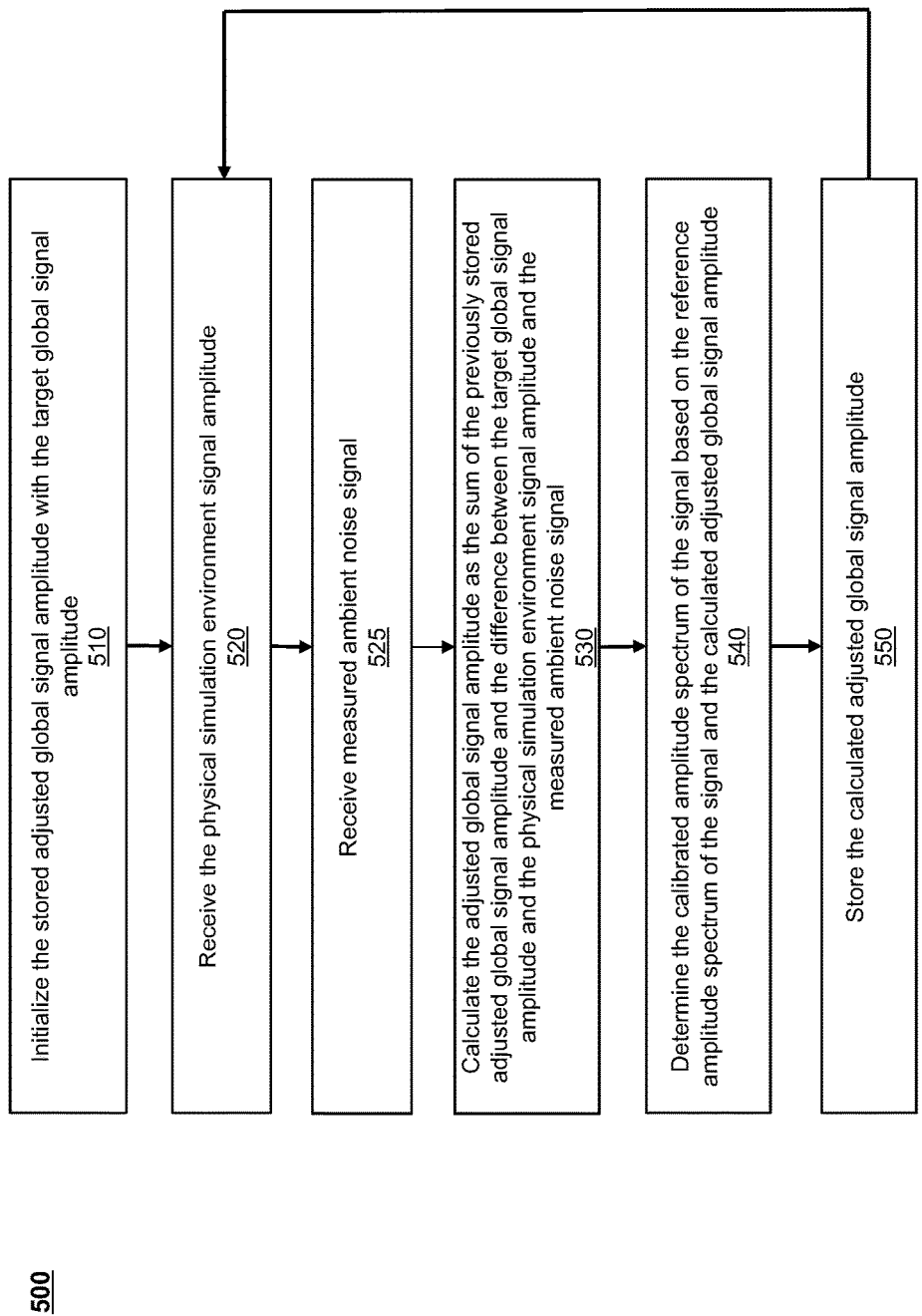

SYSTEM FOR DYNAMICALLY ADAPTING CALIBRATED MULTI-CHANNEL NON-COHERENT SIGNALS

TECHNICAL FIELD

The present disclosure relates to the field of simulation. More specifically, the present disclosure relates to a system for dynamically adapting calibrated multi-channel non-coherent signals in the context of simulation.

BACKGROUND

To render simulation more realistic, simulations of noise sounds generated during operating conditions are included in the simulation as simulated noise sounds. Simulated noise sounds are typically generated through filtering signals (e.g. signals captured during operating conditions), the isolation of various sources and a playback of the sources. Sound models outputs are mixed and sent to a distribution mixer. For example, in the context of a flight simulator, sound models are generally further adapted with equalization filters. However, those filters do not take into account multiple parameters, including the simulator ambient noise, inter-model coherent signals, channel effectiveness, channels traveling paths, etc. Consequently, the equalization filters are calibrated manually, to take into consideration these parameters.

However, the calibration information may be lost when multiple filters are applied on sound models. An additional step is needed to adapt the sound models to meet a required global sound level. If a change in the simulator ambient noise occurs, the global sound level is affected which requires new adjustments to be performed on the sound models. The application of multiple filters also affects the traceability of the sound models with the initial raw data, making updates and new adjustments difficult to perform.

Another issue occurs when the quality of a plurality of loudspeakers used for playing the plurality of simulated noise sounds during simulation is not constant. In particular, the low frequency response of the loudspeakers may vary significantly, based on the cost and quality of each one of the loudspeakers used for the simulation. Consequently, the rendering of sound models having low frequencies is significantly affected by the low frequency response of the loudspeakers in charge of playing these sound models with low frequencies.

There is therefore a need for a new system for dynamically adapting calibrated multi-channel non-coherent signals.

SUMMARY

According to a first aspect, the present disclosure provides a system for dynamically adapting calibrated multi-channel non-coherent signals. The system comprises a physical simulation environment. The system comprises a plurality of synthesizers for generating a corresponding plurality of signals. The system comprises a plurality of filters for band-pass filtering the plurality of generated signals. Each filter filters the signal generated by one of the plurality of synthesizers. Each filter is configured for performing the band-pass filtering in a dedicated frequency band. The system comprises a plurality of loudspeakers positioned on a wall of the physical simulation environment for playing the plurality of filtered signals in the physical simulation environment. Each loudspeaker plays the signal filtered by one of the plurality of filters. The system comprises a noise sensor positioned inside the physical simulation environment for measuring a physical simulation environment signal amplitude and transmitting the physical simulation environment signal amplitude to a channel configurator. The system comprises the channel configurator for configuring each filter to generate the corresponding signal according to a calibrated amplitude spectrum of the signal. The calibrated amplitude spectrum is determined based on a reference amplitude spectrum of the signal and an adjusted global signal amplitude. The adjusted global signal amplitude is calculated based on a target global signal amplitude and the physical simulation environment signal amplitude.

BRIEF DESCRIPTION OF THE DRAWINGS

Embodiments of the disclosure will be described by way of example only with reference to the accompanying drawings, in which:

FIGS. 7A and 7B illustrate the determination by the system represented in FIG. 4 of the calibrated amplitude spectrum of the signals, taking into consideration a frequency response of synthesizers generating the signals;

FIG. 15 illustrates an algorithm implemented by a channel configurator of the system represented in FIGS. 13 and 14.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the generation of calibrated multi-channel non-coherent signals used in a simulator.

Throughout the present description, the following expressions are used with relation to the corresponding description:
Loudspeaker: a device that changes electrical signals into sounds loud enough to be heard at a distance;
Physical simulation environment: physical space in which a simulation is performed, for example a room, a simulator, etc.; and
Wall: a physical delimitation either fixed or movable.

Legacy System for Generating Calibrated Multi-Channel Coherent Signals

Figure 1:
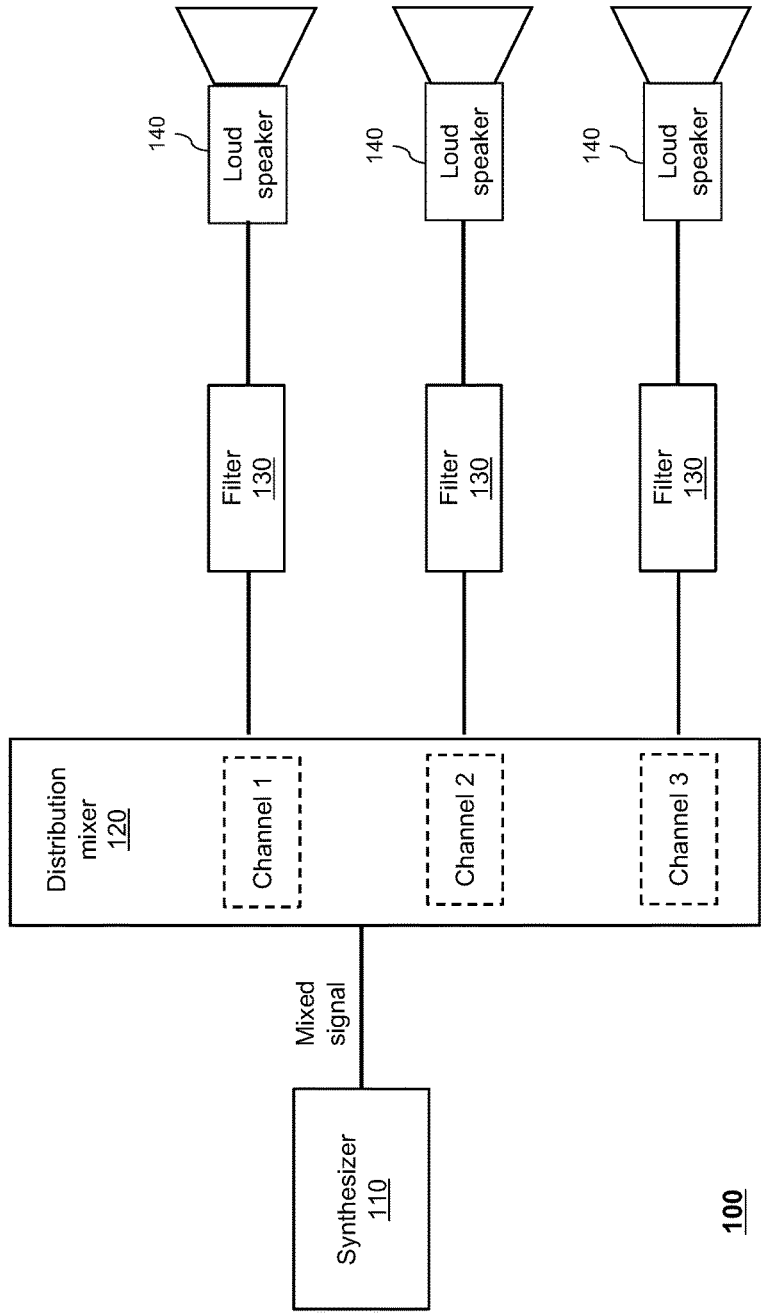
FIG. 1 illustrates a legacy system for generating calibrated multi-channel coherent signals.
Figure 2:
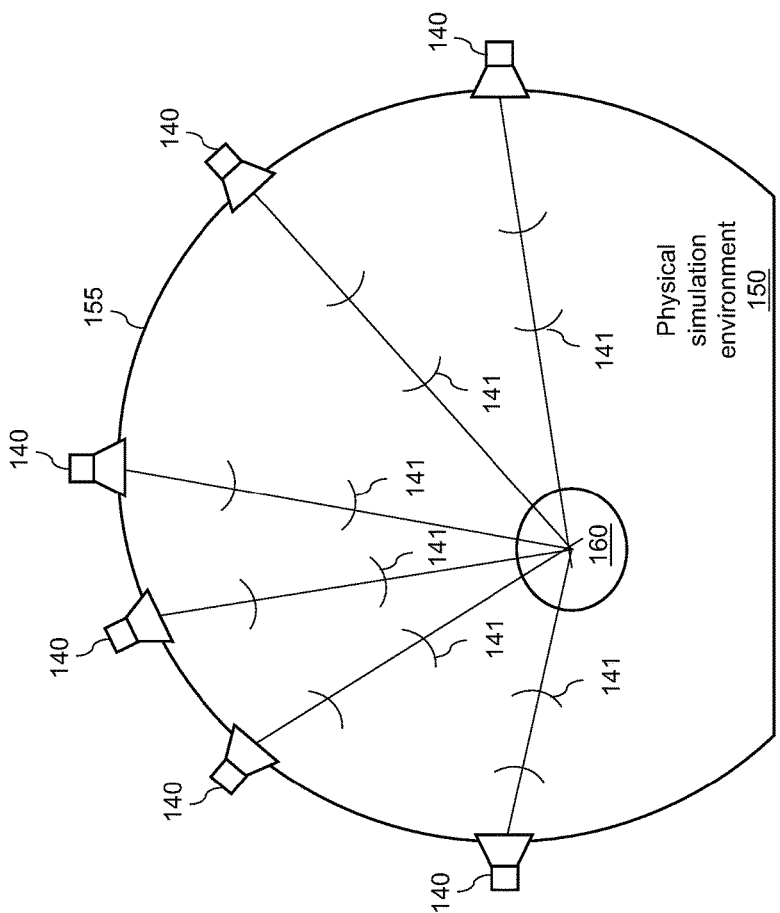
FIG. 2 illustrates a physical simulation environment of a simulator using the legacy system represented in FIG. 1.

Referring now concurrently to FIGS. 1, 2, 3A, 3B and 3C, a legacy system 100 for generating calibrated multi-channel coherent signals is represented. The system 100 comprises a synthesizer 110, a distribution mixer 120, a plurality of filters 130 and a plurality of loudspeakers 140. The plurality of loudspeakers 140 are positioned on a wall 155 of a physical simulation environment 150 of a simulator. FIG. 2 represents a horizontal sectional view of the physical simulation environment 150.

The entire physical simulation environment 150 and the simulator are not represented in FIG. 2 for simplification purposes. The term physical simulation environment shall be interpreted in a generic manner, as a physical structure where a user of the simulator is positioned for interacting with the simulator during a simulation. The position of the user of the simulator in the physical simulation environment 150 is indicated with reference 160.

The simulator may relate to any of the following: a vehicle simulator, a healthcare simulator, a military simulator, a mining simulator, etc. For example, the simulator may be an aircraft simulator, and the physical simulation environment 150 may be a simulated aircraft cockpit.

The number of loudspeakers 140, and the position of each loudspeaker 140 on the wall 155 of the physical simulation environment 150, varies based on the type of simulator, based on specific simulation needs, etc. For instance, the height of each loudspeaker 140 on the wall 155, as well as the distance between two neighboring loudspeakers 140, varies based on specific simulation needs. Furthermore, a larger number of loudspeakers 140 may allow for a more realistic simulation, while a lower number of loudspeakers 140 is more cost effective.

The position 160 of the user of the simulator is not necessarily centralized with respect to the physical simulation environment 150, as illustrated in FIG. 2. The user positioned at position 160 receives a plurality of sound signals 141 respectively played by the plurality of loudspeakers 140. The sound signals 141 simulate the real sounds that the user of the simulator would receive when placed in real conditions corresponding to the simulation being currently performed. For example, in the particular case of the simulation of an aircraft, the sound signals 141 simulate the real sounds generated by a corresponding real aircraft during a takeoff phase, during a landing phase, during a high altitude hovering phase, etc. The sound signals 141 comprise ambient noise signals of the simulated physical environment, tone signals of the simulated physical environment, a combination of ambient noise signals and tone signals, etc. Examples of noise signals for an aircraft simulator include aerodynamic hiss, the noise of engines, etc. Examples of tone signals for an aircraft simulator include the sound generated by flaps being raised or lowered, the sound generated by the deployment or retracting of landing gear, the sound generated by the activation of a hydraulic pump, etc.

Figure 3A:
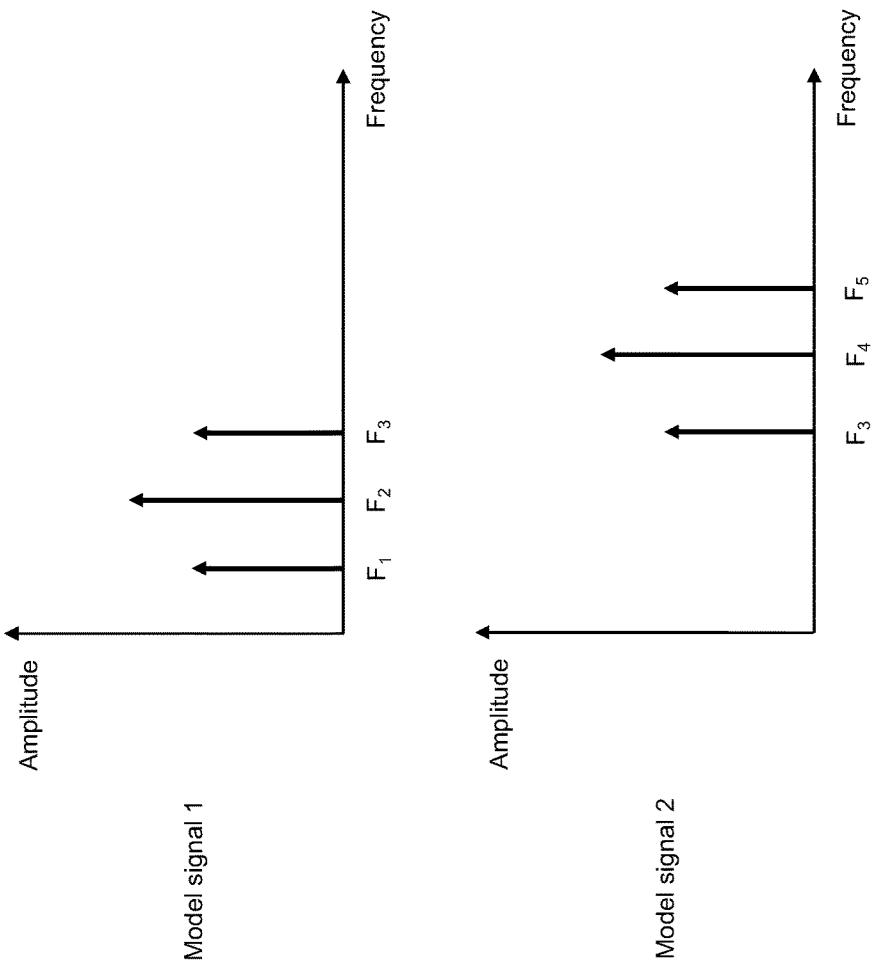
FIGS. 3A, 3B and 3C illustrate the processing by the legacy system represented in FIG. 1 of the amplitude spectrum of model signals.
Figure 3B:
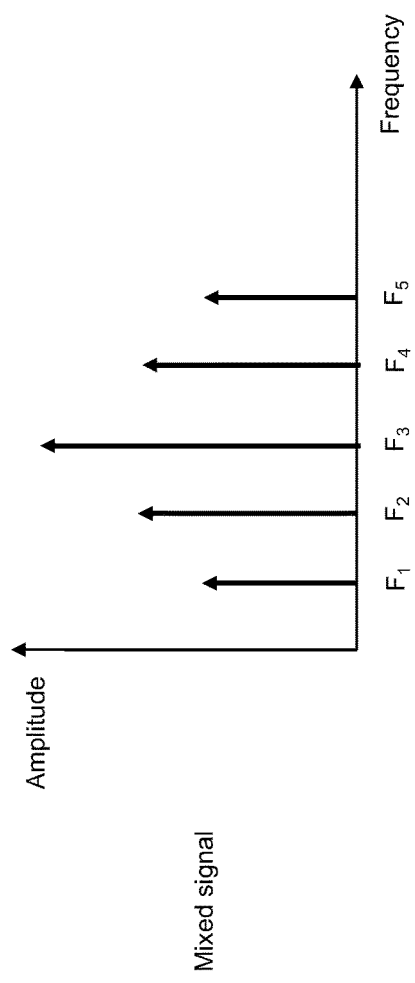

The plurality of sound signals 141 played by the plurality of loudspeakers 140 is generated by the system 100 as follows. The synthesizer 110 generates a mixed signal composed of a plurality of model signals mixed together. Each model signal simulates a particular sound (e.g. a particular noise signal or a particular tone signal) of the simulated physical environment, and has a particular amplitude spectrum. FIG. 3A illustrates a simplified example of amplitude spectrum of two model signals 1 and 2. FIG. 3B illustrates a simplified example of amplitude spectrum of the mixed signal obtained by mixing model signal 1 and model signal 2 together.

Figure 3C:
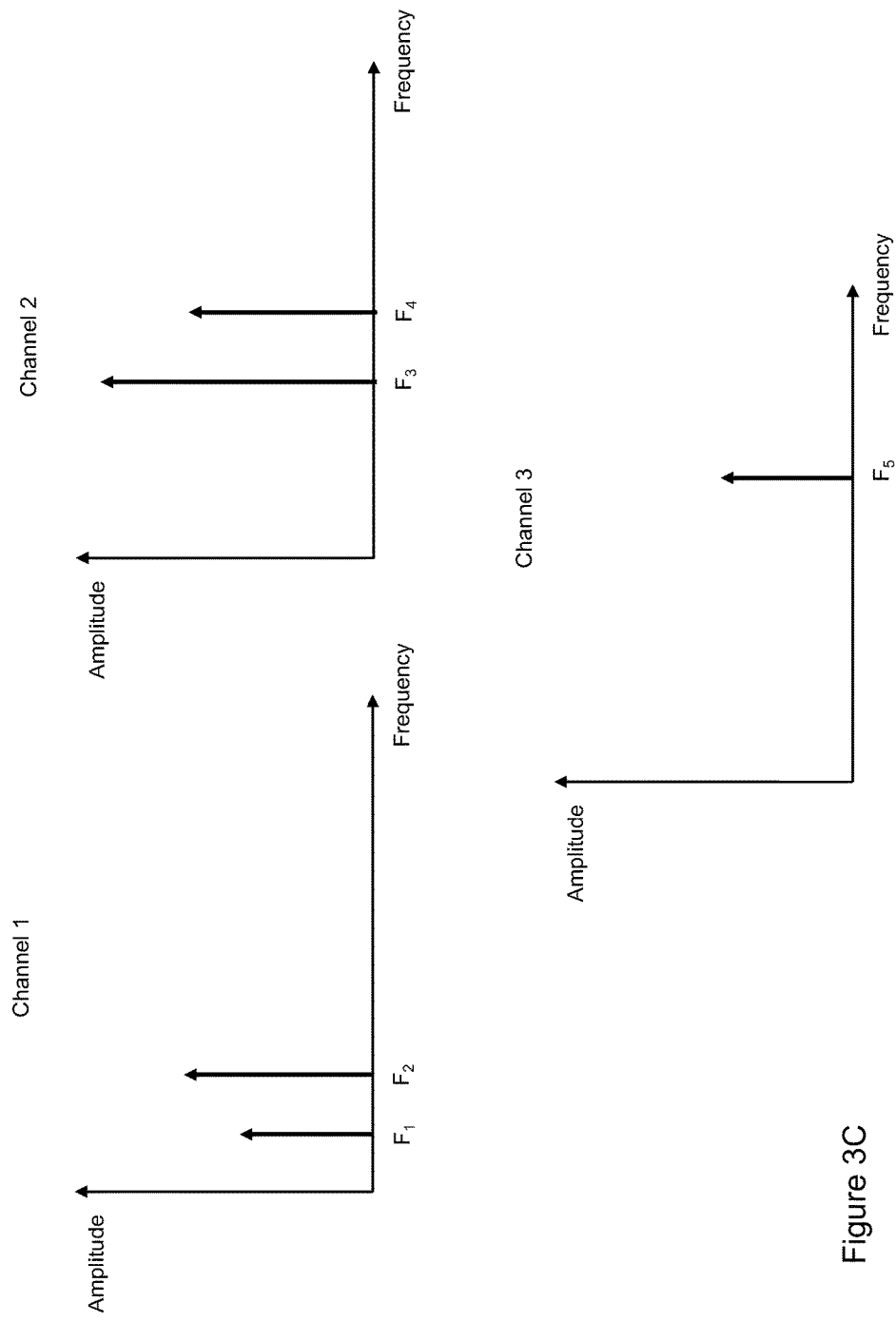

The mixed signal is transmitted to the distribution mixer 120, which splits the mixed signal into a plurality of channels. Each particular channel consists of a signal comprising a particular range of frequencies of the mixed signal. For illustrations purposes, FIG. 1 represents the splitting of the mixed signal into three channels. However, the number of channels may vary, and is at least equal to two. FIG. 3C illustrates a simplified example of the splitting of the mixed signal of FIG. 3B into three channels. Channel 1 comprises the lower frequencies (e.g. $F_1$ and $F_2$ as illustrated in FIGS. 3A-C), channel 2 comprises intermediate frequencies (e.g. $F_3$ and $F_4$ as illustrated in FIGS. 3A-C), and channel 3 comprises the higher frequencies (e.g. $F_5$ as illustrated in FIGS. 3A-C).

The signal of each channel is transmitted to an equalization filter 130. Each equalization filter 130 is configured for performing a band-pass filtering of the signal of the corresponding channel in a dedicated frequency band. The filtered signal of each channel is then transmitted to a loudspeaker 140, for playing the filtered signal of the corresponding channel. There is one dedicated filter 130 and one dedicated loudspeaker 140 for each channel generated by the distribution mixer 120. The signals 141 played by the loudspeakers 140 have been previously described with reference to FIG. 2.

The plurality of model signals mixed together by the synthesizer 110 to generate the mixed signal are generally recorded during real operating conditions of the physical environment to be simulated. A library of recorded model signals is stored at the synthesizer 110. When simulating a particular phase (e.g. takeoff, landing, etc.), the recorded model signals corresponding to the particular phase are mixed together for generating the mixed signal transmitted to the distribution mixer 20.

The filters 130 are calibrated individually, so that the combination of the sound signals 141 received by a user positioned at position 160 has an adequate amplitude. The adequate amplitude is determined by placing the user at position 160 and performing the calibration of the filters 130 until the amplitude of the combination of the sound signals 141 is adequate for performing the simulation.

Once the calibration has been performed, an operational phase of the simulation is performed. The operational phase consists in having a user positioned at position 160, for effectively performing the simulation while receiving the combination of the sound signals 141. However, if the conditions of the simulation vary slightly, the determined adequate amplitude may no longer be satisfying. In this case, the calibration of the equalization filters 130 need to be repeated, to take into consideration the variations in the conditions of the simulation. Since the calibration is a complex and time consuming process, avoiding the need for manually recalibrating the equalization filters 130 would greatly facilitate the configuration of the simulator.

Furthermore, since the mixed signal is obtained by mixing together a plurality of model signals, and the mixed signal is then split into a plurality of channels, the resulting sound signals 141 played by the loudspeakers 140 in the physical simulation environment 150 are coherent. Coherent sound signals in turn may affect the quality of the sound simulation, by creating comb filters (a delayed version of one of the model signals is added to the model signal itself, causing constructive and destructive interference).

Calibrated Multi-Channel Non-Coherent Signals

Figure 4:
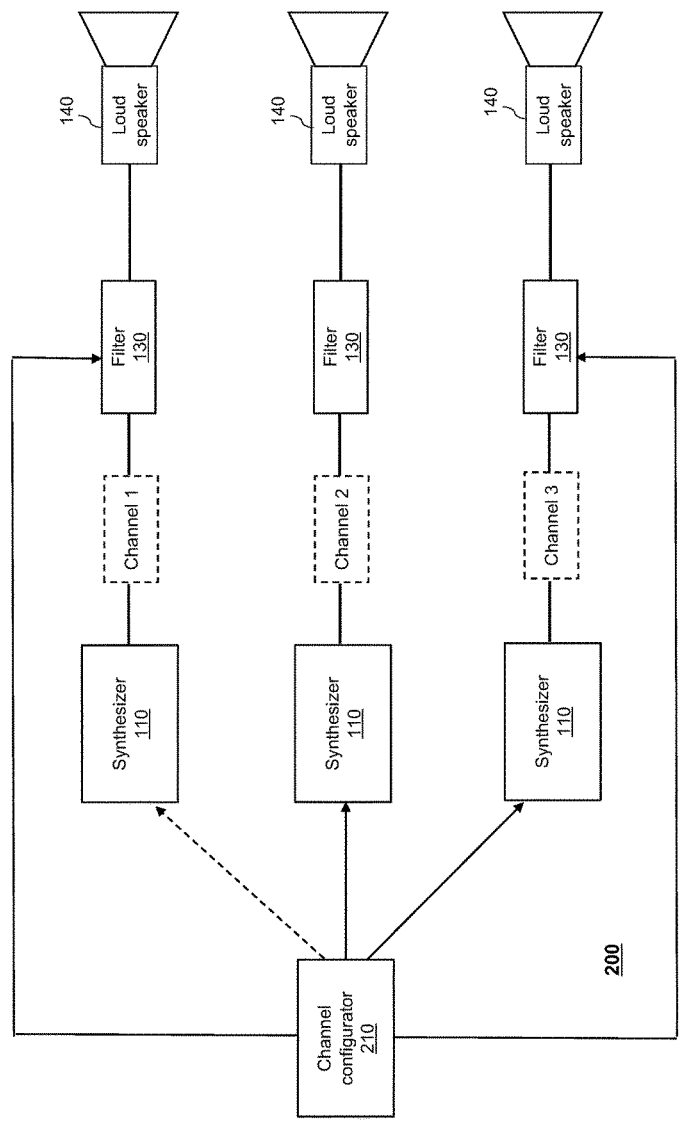
FIG. 4 illustrates a system for generating calibrated multi-channel non-coherent signals.

Referring now concurrently to FIGS. 2 and 4, a new system 200 for generating calibrated multi-channel non-coherent signals is represented in FIG. 4. The system 200 comprises a plurality of synthesizers 110, a plurality of filters 130, a plurality of loudspeakers 140, and a channel configurator 210. As mentioned previously with reference to FIG. 2, the plurality of loudspeakers 140 are positioned on the wall 155 of the physical simulation environment 150 of the simulator. A first difference with the legacy system 100 represented in FIG. 1 is that each synthesizer 110 is dedicated to a particular channel. Thus, for each particular channel, the dedicated synthesizer 110 generates a signal which is filtered by the corresponding filter 130, and is further played by the corresponding loudspeaker 140. For illustrations purposes, FIG. 4 represents three synthesizers 110 for operating three corresponding channels. However, the number of synthesizers (and corresponding channels) may vary, and is at least equal to two. A second difference with the legacy system 100 represented in FIG. 1 is the usage of the channel configurator 210, for automatically configuring the signals generated by the plurality of channels. For example, as shown on FIG. 4, the channel configurator 210 configures the filters 130 of channel 1 and channel 3, but not the filter associated with channel 2. However, the channel configurator 210 could configure the filters 130 of all channels (i.e. channels 1, 2 and 3).

The channel configurator 210 configures the filters 130 to perform band-pass filtering of the signal generated by the synthesizer 110 according to a calibrated amplitude spectrum of the signal. The calibrated amplitude spectrum is determined based on a reference amplitude spectrum of the signal and at least one parameter selected among one of the following: a target global signal amplitude, a directionality of the signal when played by the corresponding loudspeaker 140, and a frequency response of the synthesizer 110.

The calibrated amplitude spectrum is determined by the channel configurator 210, and the filters 130 are configured to perform band-pass filtering of the signal generated by the corresponding synthesizer 110 according to the calibrated amplitude spectrum. Alternatively or concurrently, as shown on FIG. 4, the channel configurator 210 configures the synthesizer 110 with information allowing the synthesizer 110 to determine the calibrated amplitude spectrum, and then generate the signal according to the calibrated amplitude spectrum.

Figure 5:
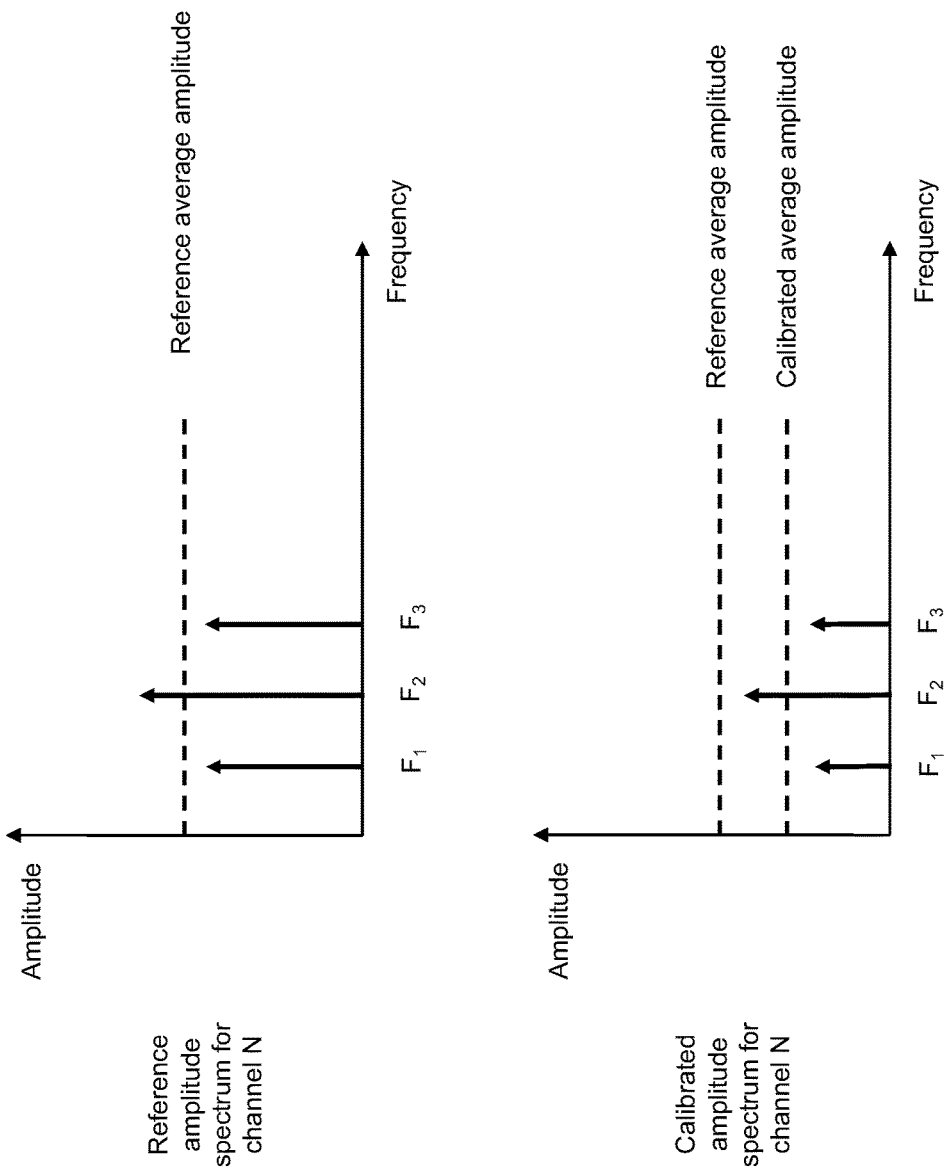
FIG. 5 illustrates the determination by the system represented in FIG. 4 of the calibrated amplitude spectrum of the signals, taking into consideration a target global signal amplitude.

Referring now to FIGS. 2, 4 and 5, the determination of the calibrated amplitude spectrum, based on the reference amplitude spectrum of the signal and the target global signal amplitude will be described.

For each channel N (e.g. channels 1, 2 and 3 illustrated in FIG. 4), a model signal for simulating a particular sound (e.g. a model noise signal or a model tone signal) of the simulator is stored at the synthesizer 110 responsible for generating the signal for channel N. The model signal is generally recorded during real operating conditions, as mentioned previously in the description. The model signal for each channel N has a reference amplitude spectrum illustrated in FIG. 5.

The target global signal amplitude is stored by the channel configurator 210. The target global signal amplitude is selected so that the combination of the sound signals 141 played by the loudspeakers 140 and received by a user positioned at position 160 in the physical simulation environment 150 has an adequate amplitude, delay, phase and ponderation when performing the simulation.

For each channel N, the channel configurator 210 configures the synthesizer 110, the filter 130, or the synthesizer 110 and the filter 130 to generate a calibrated model signal having a calibrated amplitude spectrum determined based on the corresponding model signal having the reference amplitude spectrum. The configuration of the plurality of synthesizers 110 and plurality of filters 130 takes into account the target global signal amplitude.

Various algorithms can be implemented by the channel configurator 210 for performing this configuration. For instance, as illustrated in FIG. 5, for each channel N, the reference amplitude spectrum for channel N has a reference average amplitude. Similarly, for each channel N, the calibrated amplitude spectrum for channel N has a calibrated average amplitude. The channel configurator 210 determines the calibrated average amplitudes of the channels based on the reference average amplitudes of the channels and the target global signal amplitude, so that the sum of the calibrated average amplitudes is substantially equal to the target global signal amplitude. This algorithm can be applied because the resulting signals 141 played by the loudspeakers 140 are incoherent. The determination of the calibrated average amplitudes consists in determining a common multiplying factor, so that when each reference average amplitude is multiplied by the common multiplying factor for calculating the corresponding calibrated average amplitude, the sum of the calculated calibrated average amplitudes is substantially equal to the target global signal amplitude. The common multiplying factor is transmitted by the channel configurator 210 to the synthesizer 110 and/or the filter 130, and the synthesizer 110 and/or the filter 130 uses the common multiplying factor for generating the calibrated model signal having the calibrated amplitude spectrum based on the corresponding model signal having the reference amplitude spectrum.

For each particular phase of the simulation (e.g. landing, takeoff, etc.), only a subset of the available synthesizers 110 may be used. Each one of the used synthesizer 110 generates one of the calibrated model signals used for this particular phase of the simulation. The channel configurator 210 determines which synthesizers 110 are used; and among the used synthesizers, which specific synthesizer 110 generates which specific calibrated model signal with corresponding amplitude, phase and delay and how each corresponding filter 130 is configured to perform the corresponding band-pass filtering. A different target global signal amplitude can be stored at the channel configurator 210 for each particular phase of the simulation. A library of model signals covering all the possible phases of the simulation are stored at each synthesizer 110, and calibrated model signals are generated on demand by each synthesizer 110 under the control of the channel configurator 210. Alternatively, the channel configurator 210 stores the library of model signals, and transmits a particular model signal among those present in the library to a particular synthesizer and/or to a particular filter for generating a corresponding calibrated model signal.

Figure 6:
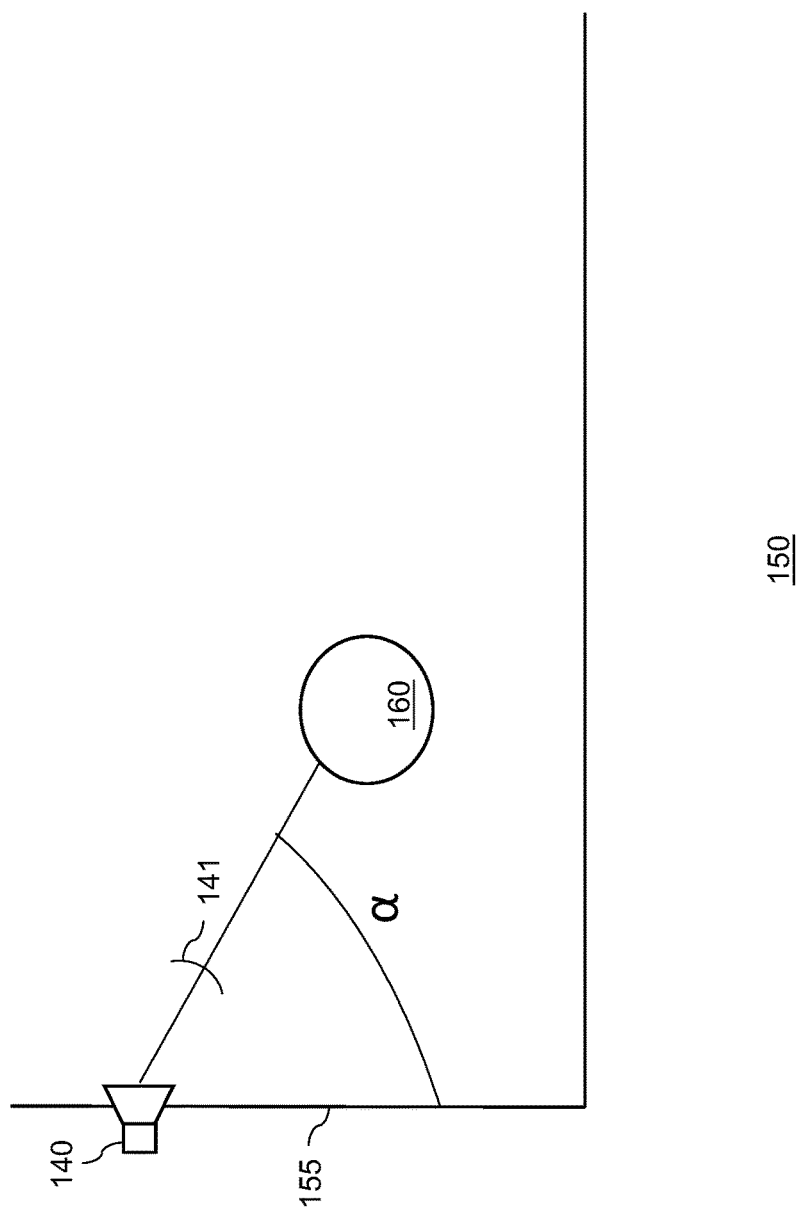
FIG. 6 illustrates the determination by the system represented in FIG. 4 of the calibrated amplitude spectrum of the signals, taking into consideration a directionality of the signals when played loudspeakers.

Referring now to FIGS. 2, 4 and 6, the determination of the calibrated amplitude spectrum of the signal generated, based on the reference amplitude spectrum of the signal and the directionality of the signal when played by the corresponding loudspeaker 140 will be described.

FIG. 7A illustrates an angle of incidence α determined between the wall 155 of the physical simulation environment 150 and the sound signal 141 played by each one of the loudspeakers 140.

The calibrated amplitude spectrum of the signal generated by a particular synthesizer 110 and the corresponding filter 130 is determined by modulating the reference amplitude spectrum of the signal with the angle of incidence α determined for the corresponding loudspeaker 140. For example, referring to FIG. 5, the reference average amplitude of the reference amplitude spectrum is modulated by the angle of incidence α to determine the calibrated average amplitude of the calibrated amplitude spectrum. An exemplary modulating factor is equal to $1/\sin(\alpha)$. In this case, if the angle of incidence of the sound signal 141 is horizontal (α is equal to 90 degrees), the modulating factor is equal to 1. If the angle of incidence of the sound signal 141 is not horizontal (α is greater or lower than 90 degrees), the modulating factor is greater to 1 and increases as the angle of incidence α increases.

Referring now to FIGS. 2, 4, 7A and 7B, the determination of the calibrated amplitude spectrum of the signal generated by the synthesizer 110 and filter by the corresponding filter 130, based on the reference amplitude spectrum of the signal and a frequency response of the synthesizer 110 will be described.

For each channel, either the synthesizer 110 and/or the filter 130 is configured to generate the calibrated model signal. For example, the frequency response of the synthesizer 110 may be static, so that this particular synthesizer 110 always applies the same frequency response, and the corresponding filter 130 is configured to perform band-pass filtering according to the calibrated amplitude spectrum of the signal determined by the channel configurator 210. Alternatively, if the frequency response of the synthesizer 110 is dynamic, the synthesizer 110 is configured by the channel configurator 210 with a particular frequency response adapted to the particular model signal processed by the synthesizer 110. The static or dynamic response is stored by the synthesizer 110.

FIG. 7A represents the reference amplitude spectrum of the model signal for a channel N. The synthesizer 110 in charge of channel N is configured with the frequency response also represented in FIG. 7A. For illustration purposes, the frequency response is a band-pass filter only allowing the frequencies of the model higher than $F_{min}$ and lower than $F_{max}$. The boundaries of the band-pass filter ($F_{min}$ and $F_{max}$) are configured by the channel configurator 210.

Figure 7B:
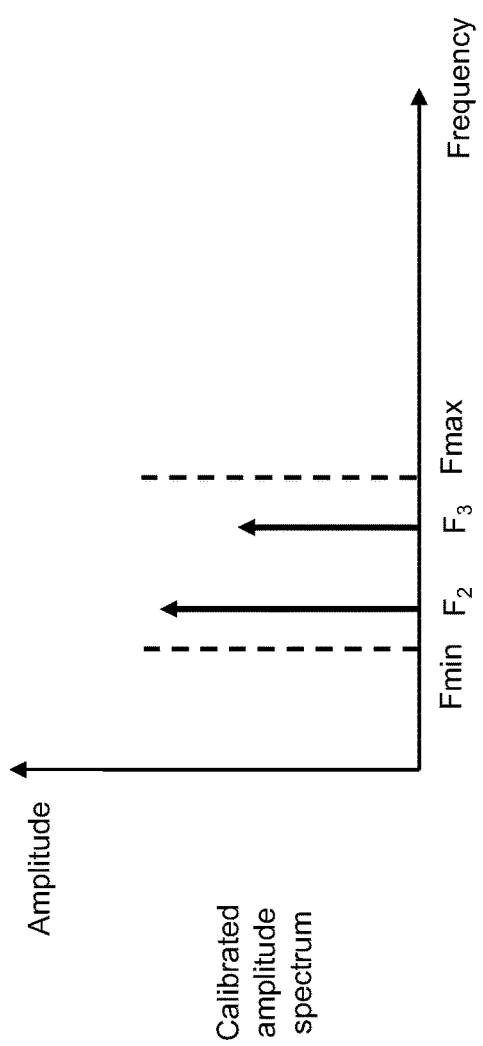

FIG. 7B represents the calibrated amplitude spectrum of the calibrated model signal after applying the calibrated filter 130 to the signal generated by the corresponding synthesizer 110. The frequency $F_1$ of the signal generated by the synthesizer 110 has been cut, while the frequencies $F_2$ and $F_3$ have been allowed, by the filter 130. Thus, the calibrated amplitude spectrum of the calibrated model signal only comprises frequencies $F_2$ and $F_3$.

The band-pass filter illustrated in FIG. 7A is for illustration purposes only. Other types of frequency responses (e.g. low pass filter, high pass filer, etc.) can be configured, and applied to the model signal by the filter 130 to generate the calibrated model signal.

In a particular embodiment, the frequency response of each filter 130 is a band-pass filter allowing frequencies in a frequency band [$F_{min}$, $F_{max}$] corresponding to one third of an octave. For instance, a first filter 130 has a frequency band corresponding to the 1st third of a particular octave. A second filter 130 has a frequency band corresponding to the 2nd third of the particular octave. A third filter 130 has a frequency band corresponding to the 3rd third of the particular octave. A fourth filter 130 has a frequency band corresponding to the first third of the octave following the particular octave, etc.

The aforementioned parameters (target global signal amplitude, directionality of the signal when played by the corresponding loudspeaker 140, and frequency response of the filter 130) may be combined for determining the calibrated amplitude spectrum of the calibrated model signal generated by the synthesizer 110, based on the reference amplitude spectrum of the model signal. Any combination of two of the parameters, and also the combination of the three parameters, can be used for determining the calibrated amplitude spectrum of the calibrated model signal. For example, as illustrated previously, the frequency response of the synthesizer 110 is used for adjusting out frequencies, phase and delay of the reference amplitude spectrum of the model signal. Then, the target global signal amplitude is used for adapting the reference average amplitude of the remaining frequencies (the one which have not been filtered out) of the reference amplitude spectrum of the model signal.

Referring now to FIGS. 8A, 8B, 8C and 9, several alternatives of channel configuration are illustrated.

The signal generated by each one of the synthesizers 100 consists of one of the following: a noise signal, a combination of noise signals, a tone signal, a combination of tone signals, and a combination of at least one noise signal and at least one tone signal.

Figure 8A:
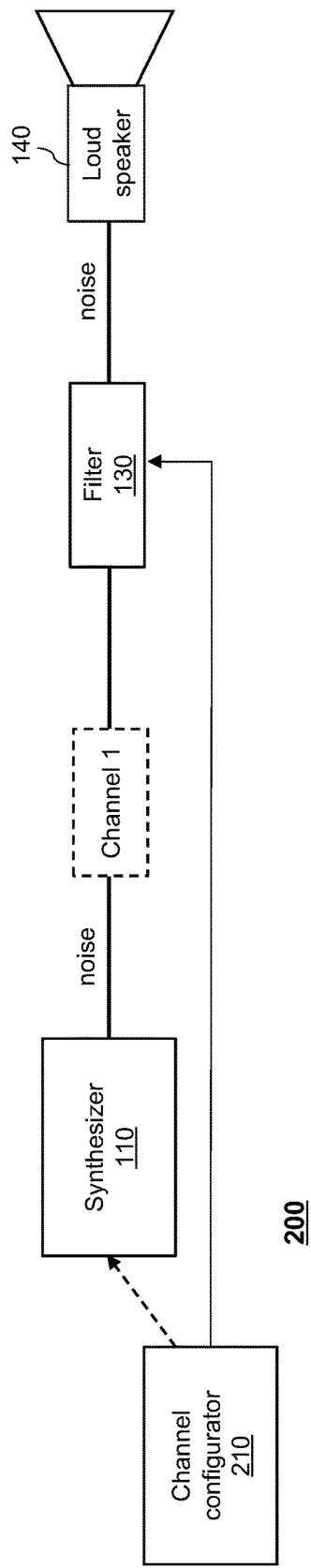
FIGS. 8A, 8B and 8C illustrate different examples of channel configurations.

FIG. 8A illustrates a synthesizer 110 generating a noise signal, which is filtered by the corresponding filter 130 and played by the corresponding loudspeaker 140. Alternatively, the global noise signal played by the synthesizer 110 is a combination of several independent noise signals.

Figure 8B:
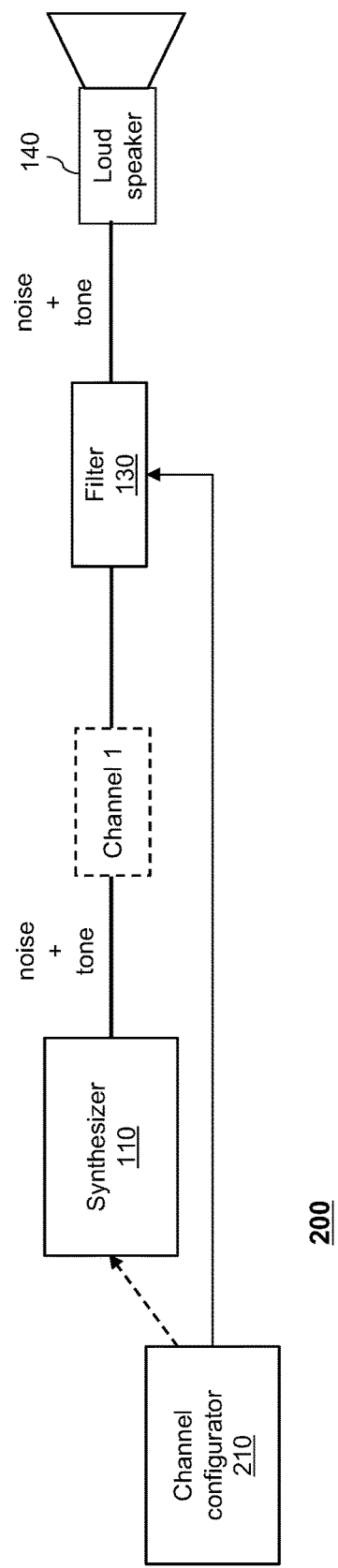

FIG. 8B illustrates a synthesizer 110 generating a combination of a noise signal and a tone signal, which is filtered by the corresponding filter 130 and played by the corresponding loudspeaker 140.

Figure 8C:
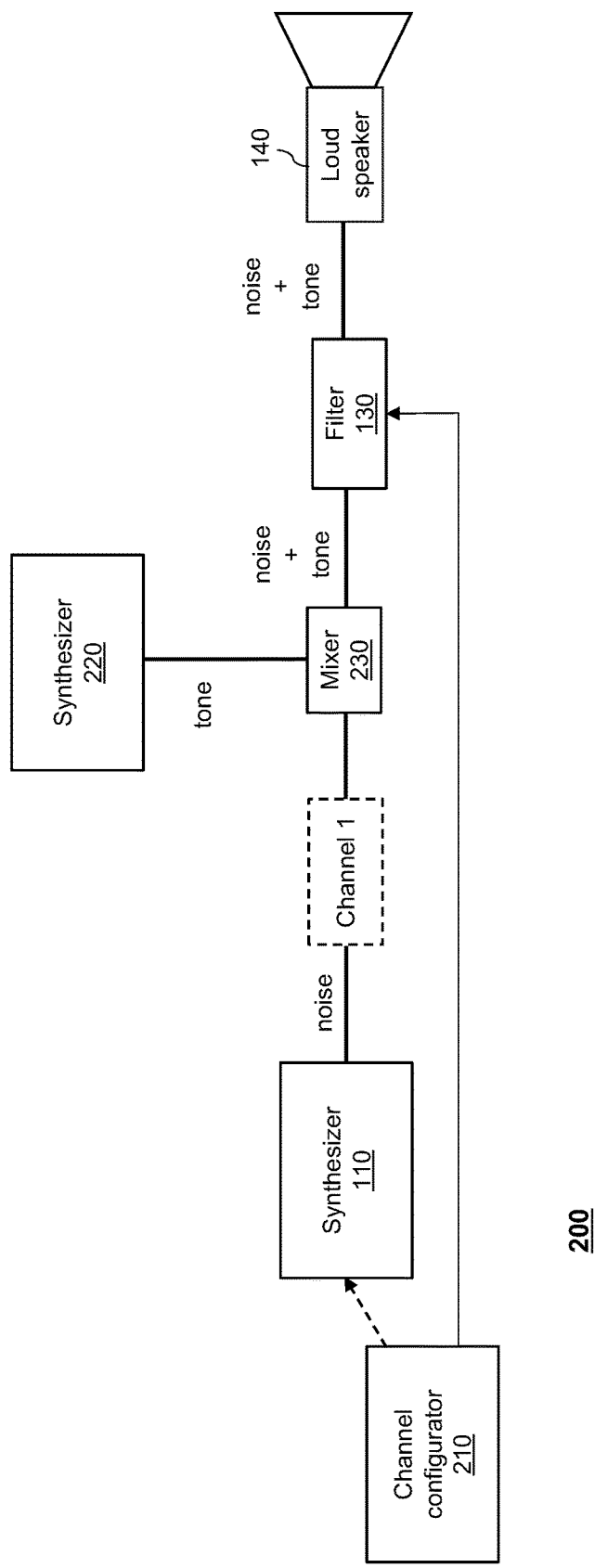

FIG. 8C illustrates a synthesizer 110 generating a noise signal. A mixer 230 is included in the system 200 for mixing the noise signal generated by the synthesizer 110 with a tone signal generated by another synthesizer 220. The resulting combination of the noise signal and the tone signal is filtered by the corresponding filter 130 and played by the corresponding loudspeaker 140.

Figure 9:
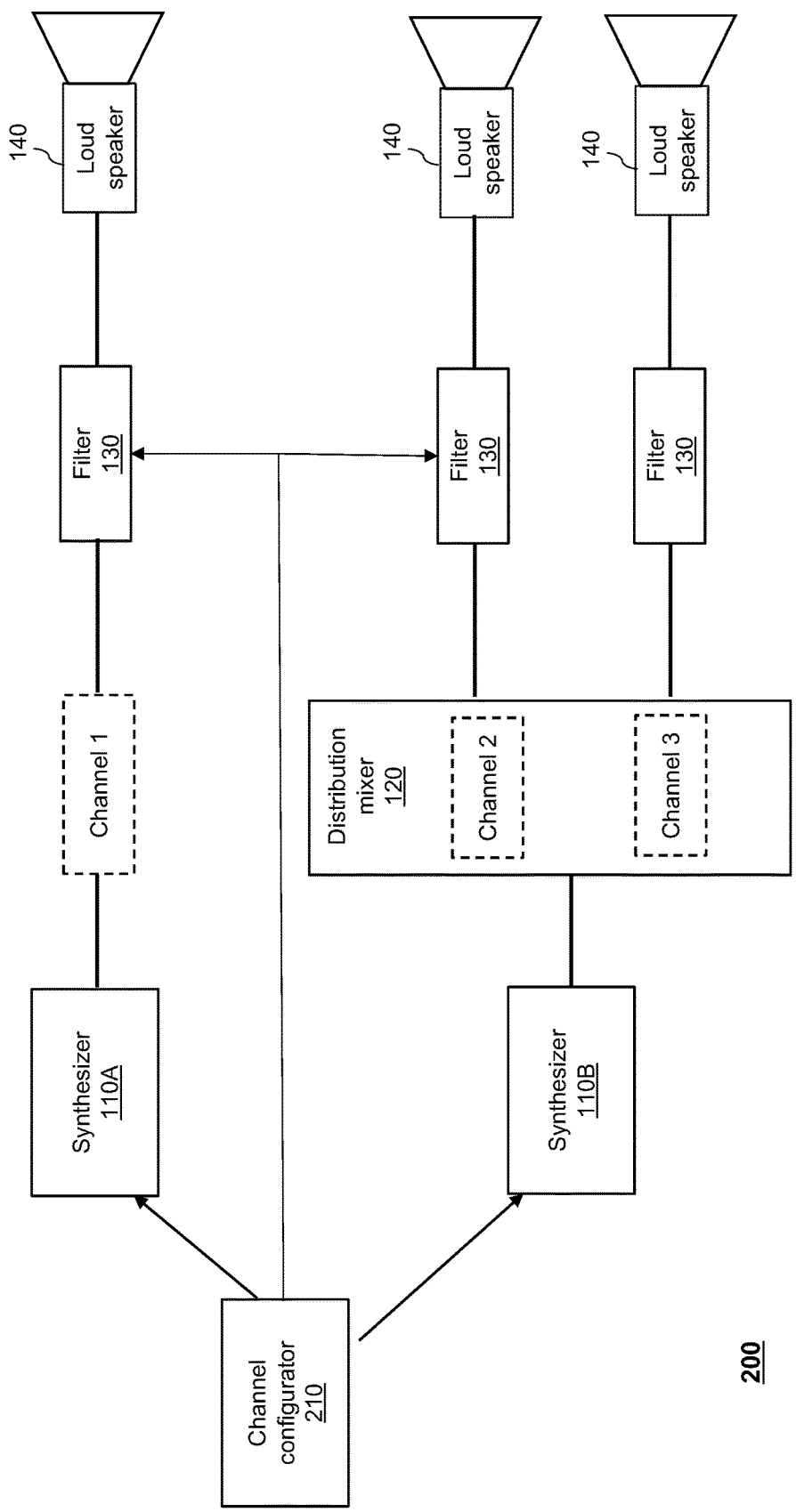
FIG. 9 illustrates a different embodiment of the system represented in FIG. 4 for generating different types of signals.

Referring now to FIG. 9, a combination of synthesizer(s) 110A operating under the control of the channel configurator 210 (as illustrated in FIG. 4) and synthesizer(s) 110B operating in combination with a distribution mixer 120 (as illustrated in FIG. 1) is represented. The synthesizer 110A is configured by the channel configurator 210, and operates accordingly, as previously described. The synthesizer 110A generates a calibrated model signal on channel 1. The synthesizer 110B and the distribution mixer 120 operate as previously described. A mixed signal composed of two model signals mixed together is generated by the synthesizer 110B, and split by the distribution mixer 120 into two corresponding signals transmitted on channels 2 and 3. The synthesizer 110B may also be operating under the control of the channel configurator 210, in a manner similar to the synthesizer 110A.

The channel configurator 210 further configures the filters 130 of the channels 1 and 2 to perform band-pass filtering according to the calibrated amplitude spectrum for received by the channel configurator 210. As shown on FIG. 9, the present channel configurator 210 may calibrate the filters 130 of several channels, without necessarily calibrating the filters 130 of all channels.

Figure 10:
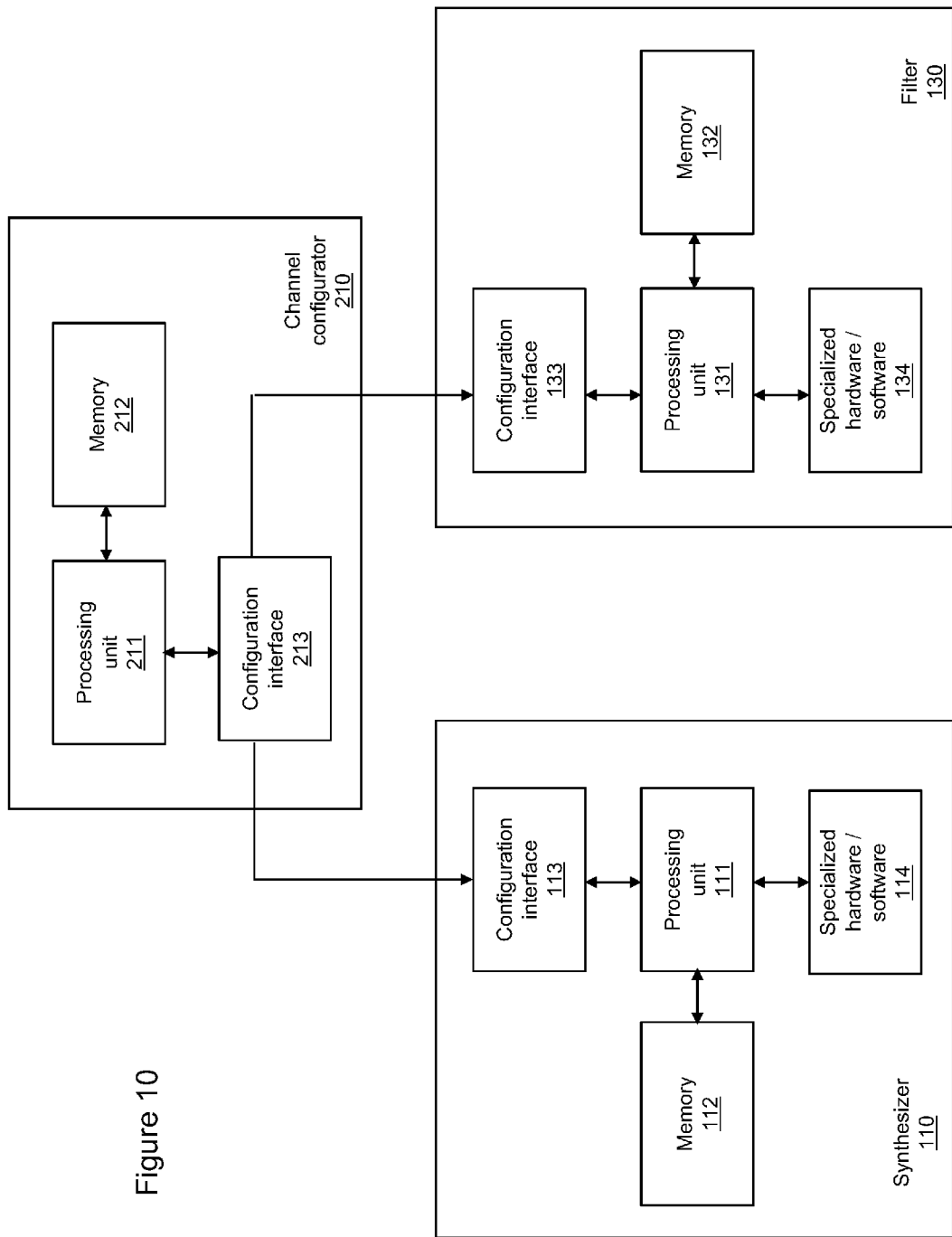
FIG. 10 is schematic representation of several components of the system represented in FIG. 4.

Referring now to FIG. 10, details of the channel configurator 210, synthesizer 110 and filter 130 will be described.

The channel configurator 210 comprises a processing unit 211, having one or more processors (not represented in FIG. 10 for simplification purposes) capable of executing instructions of computer program(s) (e.g. a configuration algorithm). Each processor may further have one or several cores.

The channel configurator 210 also comprises memory 212 for storing instructions of the computer program(s) executed by the processing unit 211, data generated by the execution of the computer program(s), data received via a configuration interface 213 of the channel configurator 210, etc. The channel configurator 210 may comprise several types of memories, including volatile memory, non-volatile memory, etc.

The channel configurator 210 further comprises the configuration interface 213. For instance, the configuration interface 213 comprises a communication interface (e.g. a Wi-Fi interface, an Ethernet interface, a cellular interface, a combination thereof, etc.) for exchanging data with other entities (such as the synthesizer 110, optionally the filter 130, a remote computing entity, etc.) over a communication network. The configuration interface 213 may also comprise a user interface (e.g. a mouse, a keyboard, a trackpad, a touchscreen, etc.) for allowing a user to interact with the channel configurator 210.

Optionally, the channel configurator 210 further comprises a display (e.g. a regular screen or a tactile screen) for displaying data generated by the processing unit 211.

The channel configurator 210 may be implemented by a standard desktop or laptop computer, or by a dedicated computing device having computing capabilities and performances.

The synthesizer 110 comprises a processing unit 111, having one or more processors (not represented in FIG. 10 for simplification purposes) capable of executing instructions of computer program(s) (e.g. a configuration algorithm). Each processor may further have one or several cores.

The synthesizer 110 also comprises memory 112 for storing instructions of the computer program(s) executed by the processing unit 111, data generated by the execution of the computer program(s), data received via a configuration interface 113 of the synthesizer 110, etc. The synthesizer 110 may comprise several types of memories, including volatile memory, non-volatile memory, etc.

The synthesizer 110 further comprises the configuration interface 113. For instance, the configuration interface 113 comprises a communication interface (e.g. a Wi-Fi interface, an Ethernet interface, a cellular interface, a combination thereof, etc.) for exchanging data with other entities (such as the channel configurator 210, a remote computing entity, etc.) over a communication network.

The synthesizer 110 also comprises specialized hardware and/or specialized software 114 for performing the generation of the signals generated by the synthesizer 110.

The filter 130 comprises a processing unit 131, having one or more processors (not represented in FIG. 10 for simplification purposes) capable of executing instructions of computer program(s) (e.g. a configuration algorithm). Each processor may further have one or several cores.

The filter 130 also comprises memory 132 for storing instructions of the computer program(s) executed by the processing unit 131, data generated by the execution of the computer program(s), data received via a configuration interface 133 of the filter 130, etc. The filter 130 may comprise several types of memories, including volatile memory, non-volatile memory, etc.

The filter 130 further comprises the configuration interface 133. For instance, the configuration interface 133 comprises a communication interface (e.g. a Wi-Fi interface, an Ethernet interface, a cellular interface, a combination thereof, etc.) for exchanging data with other entities (such as the channel configurator 210, a remote computing entity, etc.) over a communication network.

The filter 130 also comprises specialized hardware and/or specialized software 134 for performing the filtering of the signals filtered by the filter 130 as instructed by the channel configurator 210.

Examples of data received via the configuration interface 213 of the channel configurator 210, include: the target global signal amplitude, the library of model signals having respective reference amplitude spectrums, etc.

Examples of data transmitted by the configuration interface 213 of the channel configurator 210, received by the configuration interface 113 of the synthesizer 110, and stored in the memory 112 of the synthesizer 110, include: the reference amplitude spectrum of the model signal, the frequency response of the synthesizer 110, the common multiplying factor for calculating the calibrated average amplitude of the calibrated model signal based on the reference average amplitude of the model signal, etc.

Examples of data transmitted by the configuration interface 213 of the channel configurator 210, received by the configuration interface 133 of the filter 130, and stored in the memory 132 of the filter 130, include: the dedicated frequency band and/or amplitude for performing the band-pass filtering function of the filter 130.

Selecting a Loudspeaker Based on its Low Frequency Rendering

Referring now concurrently to FIGS. 4, 11, 12A, 12B and 12C, the system 200 for selecting a loudspeaker based on its low frequency rendering is represented. The system 200 represented in FIG. 11 comprises the plurality of synthesizers 110, the plurality of filters 130, the plurality of loudspeakers 140, and the channel configurator 210.

Figure 11:
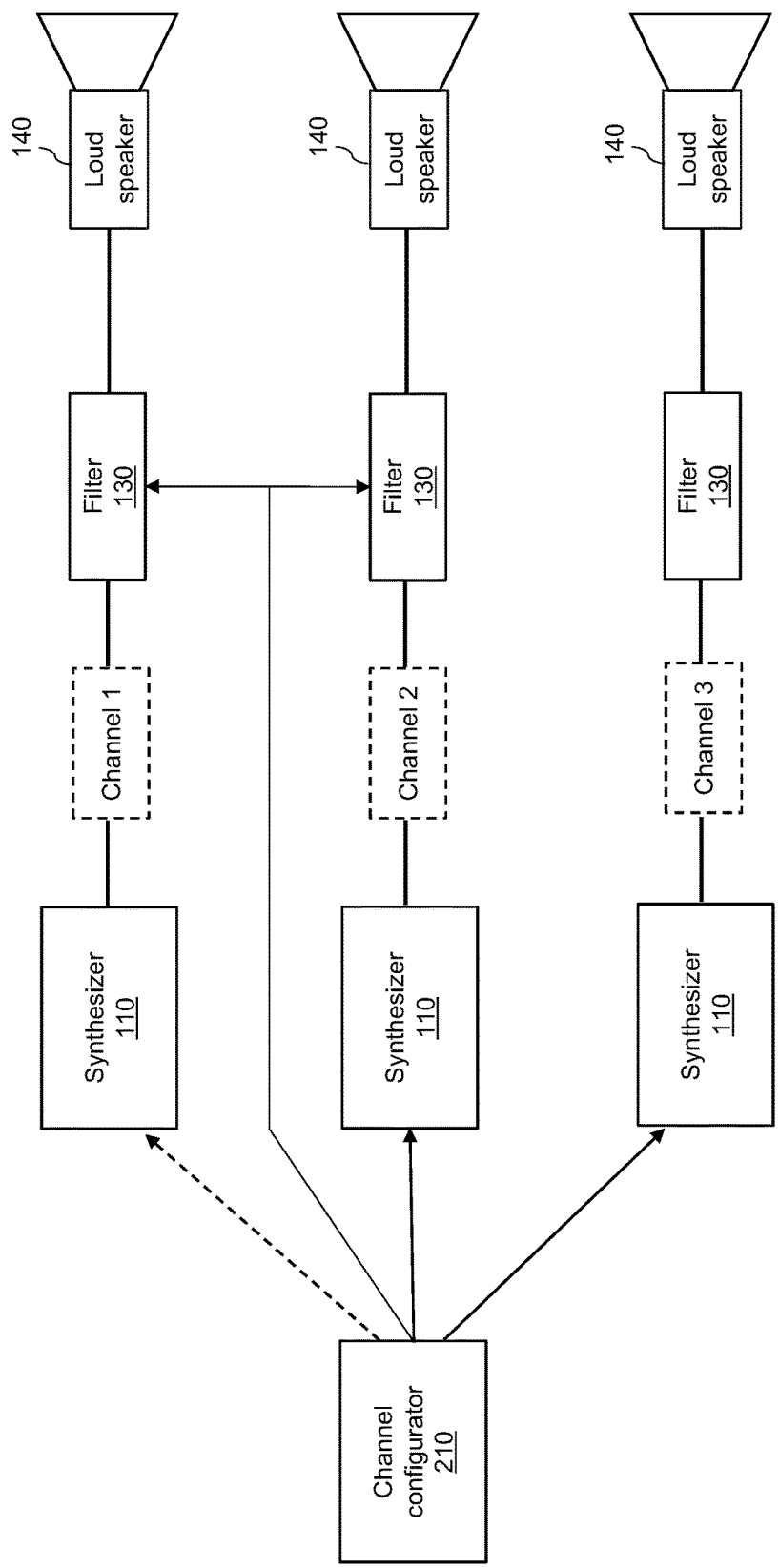
FIG. 11 illustrates selection of a loudspeaker based on its low frequency rendering.

Each synthesizer 110 is dedicated to a particular channel. Thus, for each particular channel, the dedicated synthesizer 110 generates a signal which is filtered by the corresponding filter 130, and is further played by the corresponding loudspeaker 140. For illustrations purposes, FIG. 11 represents three synthesizers 110 for operating three corresponding channels. However, the number of synthesizers (and corresponding channels) may vary, and is at least equal to two. As mentioned previously with reference to FIG. 2, the plurality of loudspeakers 140 are positioned on the wall 155 of the physical simulation environment 150 of the simulator. The channel configurator 210 selects a particular loudspeaker 140 based on its low frequency rendering.

The functionalities of the channel configurator 210 represented in FIG. 4 further comprises dedicated software component(s) (and optionally dedicated hardware component(s)) for selecting a loudspeaker based on its low frequency rendering.

The filters 130 may be selected and/or configured so as to have the same low frequency rendering. For example, for controlling the cost of the system 200, a combination of lower quality and cheaper filters 130 (with poor low frequency rendering), and higher quality and more expensive filters 130 (with good or excellent low frequency rendering), is used. Additionally, the system 200 may require that some of the filers 130 have a good or excellent high frequency rendering, a good or excellent rendering of a particular range of frequencies, etc. Thus, each filter 130 may have a specific frequency rendering, and in particular the low frequency rendering of at least some of the filters 130 may differ significantly.

If the system 200 needs to generate a model signal having a reference amplitude spectrum with low frequencies, the channel configurator 210 selects one among the plurality of loudspeakers 140 based on the reference amplitude spectrum of the model signal and a low frequency response of each one of the plurality of loudspeakers 130. The reference amplitude spectrum may only comprise low frequencies (the model signal is a bass signal). Alternatively, the reference amplitude spectrum comprises low frequencies along with other frequencies. The channel configurator 210 only aims at optimizing the rendering of the low frequencies of the reference amplitude spectrum.

Figure 12A:
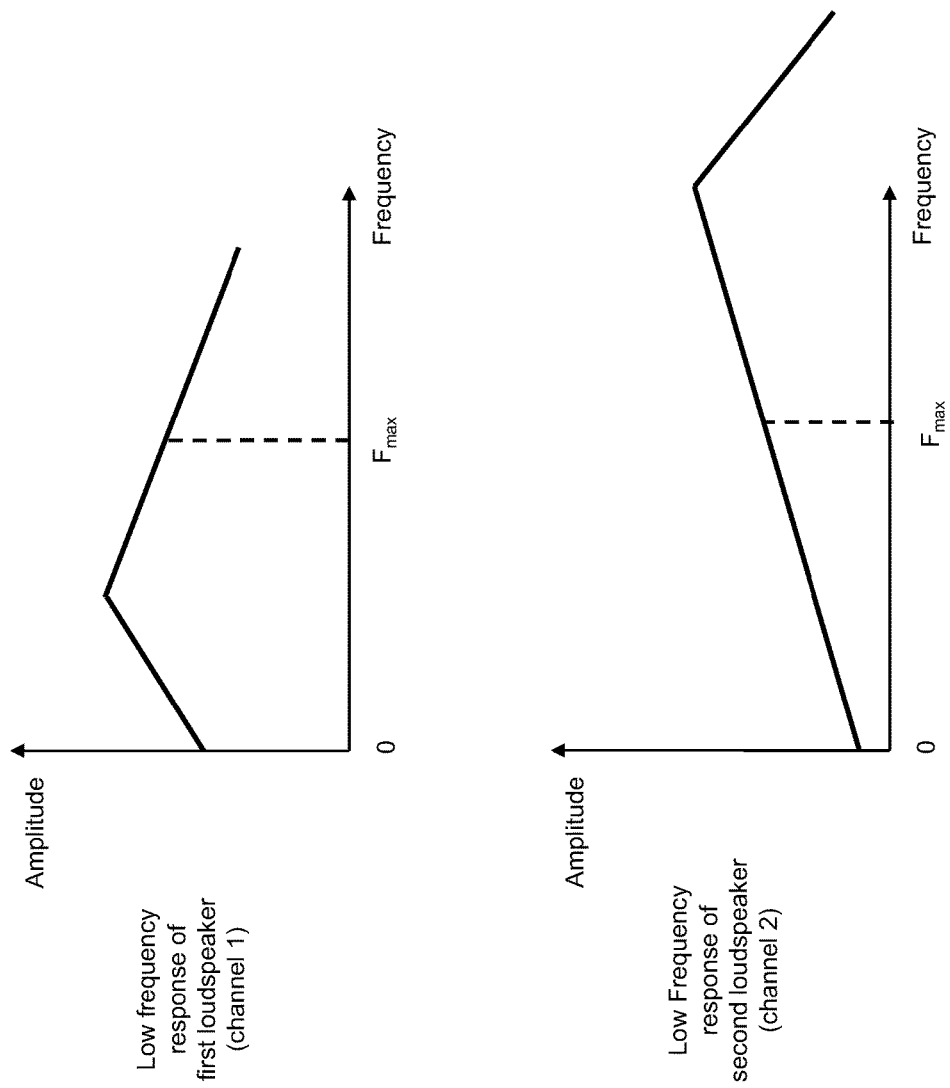
FIGS. 12A, 12B and 12C illustrate an exemplary selection by the system of FIG. 11 of a loudspeaker among two loudspeakers having respective low frequency responses.

FIG. 12A illustrates an exemplary low frequency response of two loudspeakers 140. The low frequency response represents the maximum amplitude of a signal played by each loudspeaker 140 for frequencies included in a low frequency range. A first low frequency response is represented for a first loudspeaker 140 associated to channel 1. A second low frequency response is represented for a second loudspeaker 140 associated to channel 2. Only two channels are considered for simplification purposes, but the selection is performed based on the low frequency response of all the channels of the system 200.

The low frequency response for the first loudspeaker 140 associated to channel 1 is good in a range of low frequencies $[0, F_{max}]$. A signal played by the first loudspeaker 140 is rendered with a good restitution of the amplitude in the low frequency range $[0, F_{max}]$.

The low frequency response for the second loudspeaker 140 associated to channel 2 is bad in the range of low frequencies $[0, F_{max}]$. A signal played by the second loudspeaker 140 is rendered with a bad restitution of the amplitude in the low frequency range $[0, F_{max}]$. The amplitude is cut as will be illustrated in FIG. 12B.

Figure 12B:
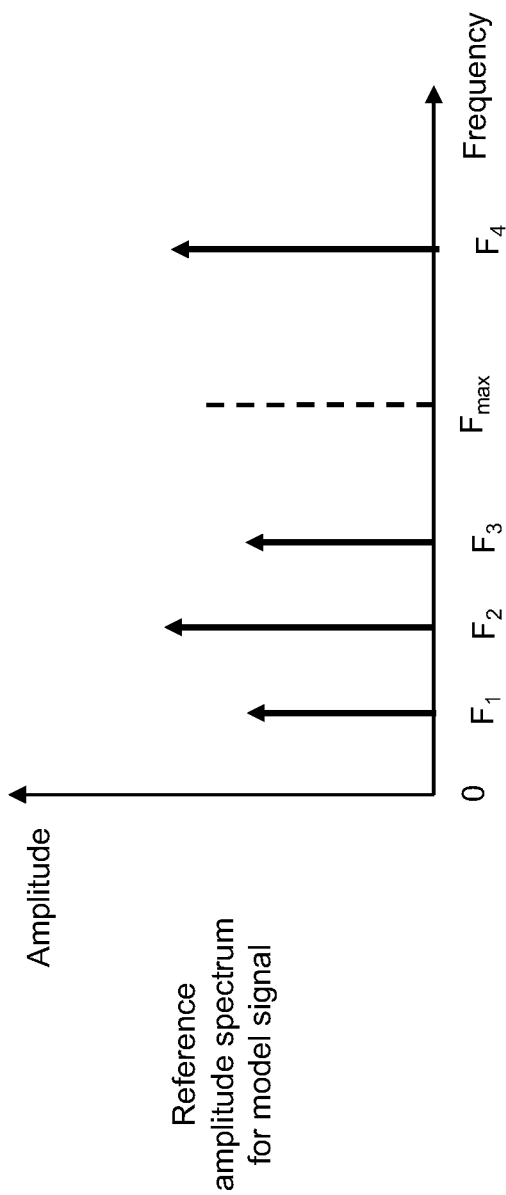

FIG. 12B illustrates an exemplary reference amplitude spectrum of a model signal. The amplitude of the model signal is represented for three exemplary frequencies ($F_1$, $F_2$ and $F_3$) included in the range of low frequencies $[0, F_{max}]$ of the model signal. The amplitudes of the model signal outside the range of low frequencies (frequencies greater than $F_{max}$ such as $F_4$ for example) is not taken into consideration by the '.

The range of low frequencies $[0, F_{max}]$ taken into consideration by the selection algorithm applied by the channel configurator 210 may be statically configured. Alternatively, the range of low frequencies $[0, F_{max}]$ taken into consideration by the selection algorithm is dynamically adapted for each specific model signal, based on the particular reference amplitude spectrum of the model signal. Instead of starting at 0, the range of low frequencies may start at a lower frequency $F_{min}$ and finish at the higher frequency $F_{max}$, for example 20-200 Hz.

Figure 12C:
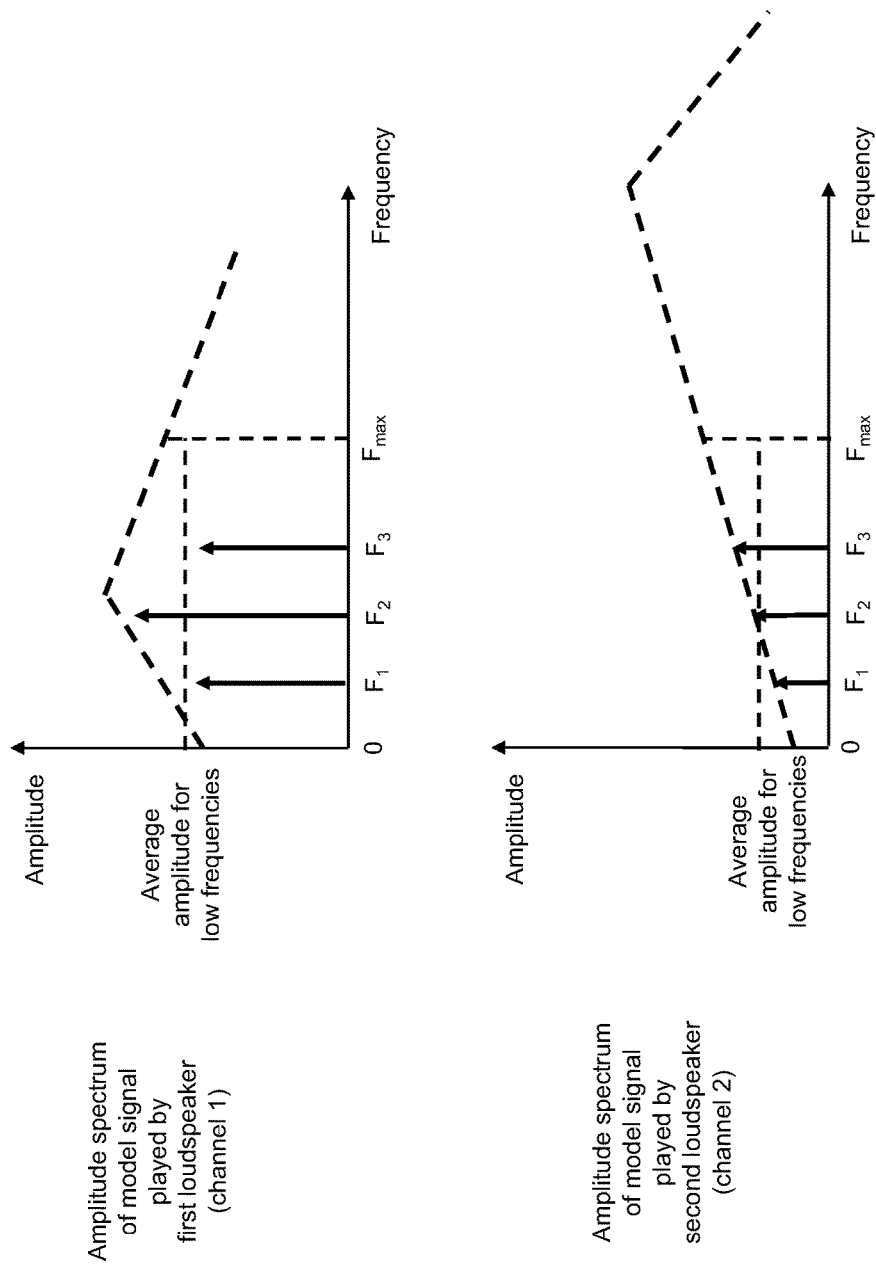

FIG. 12C illustrates the amplitude spectrum of the model signal played respectively by the first loudspeaker 140 (channel 1) and the second loudspeaker 140 (channel 2).

The amplitude spectrum of the model signal played by the first loudspeaker 140 (associated to channel 1) in the range of low frequencies $[0, F_{max}]$ is the same as the reference amplitude spectrum represented in FIG. 12B. The rendering of the model signal in the low frequencies is adequate.

The amplitude spectrum of the model signal played by the second loudspeaker 140 (associated to channel 2) in the range of low frequencies $[0, F_{max}]$ is degraded when compared to the reference amplitude spectrum represented in FIG. 12B (the amplitude of the model signal at the frequencies $F_1$, $F_2$ and $F_3$ has been cut by the second loudspeaker 140). The rendering of the model signal in the low frequencies is not adequate.

In this particular example, the channel configurator 210 selects the first loudspeaker 140 associated to channel 1. Upon selection by the channel configurator 210, the synthesizer 110 associated to channel 1 generates the model signal. Then, the filter 130 associated to channel 1 filters the generated model signal. Finally, the selected loudspeaker 140 (associated to channel 1) plays the filtered model signal. The generation of the model signal by the synthesizer 110 under the control of the channel configurator 210 is similar to the generation of the model signal by the synthesizer 110 represented in FIG. 4. Only two channels have been considered for simplification purposes in this particular example. However, the selection is performed taking into consideration all the channels of the system 200.

An exemplary implementation of the selection algorithm performed by the channel configurator 210 is as follows. Based on the low frequency response of the loudspeakers 140 for all the channels (FIG. 12A) and the reference amplitude spectrum of the model signal (FIG. 12B), a simulated average amplitude for the low frequencies is calculated (FIG. 12C). The simulated average amplitude for the low frequencies consists in the average amplitude of the reference signal when played by each loudspeaker 140 calculated over the low frequency band (e.g. $[0, F_{max}]$). The channel associated with the loudspeaker 140 providing the highest simulated average amplitude for the low frequencies is selected.

The memory of the channel configurator 210 stores the low frequency response of all the loudspeakers 140, and reference amplitude spectrums for a library of model signals which can be generated by the synthesizers 110. Upon selection of the channel associated with one of the loudspeakers 140 for playing a particular model signal, the channel configurator 210 configures via its configuration interface the synthesizer 110 associated with the selected channel to generate the particular model signal. For instance, the channel configurator 210 transmits via its configuration interface the reference amplitude spectrum of the particular model signal to the synthesizer 110 associated with the selected channel.

Dynamically Adapting Calibrated Multi-Channel Non-Coherent Signals

Figure 13:
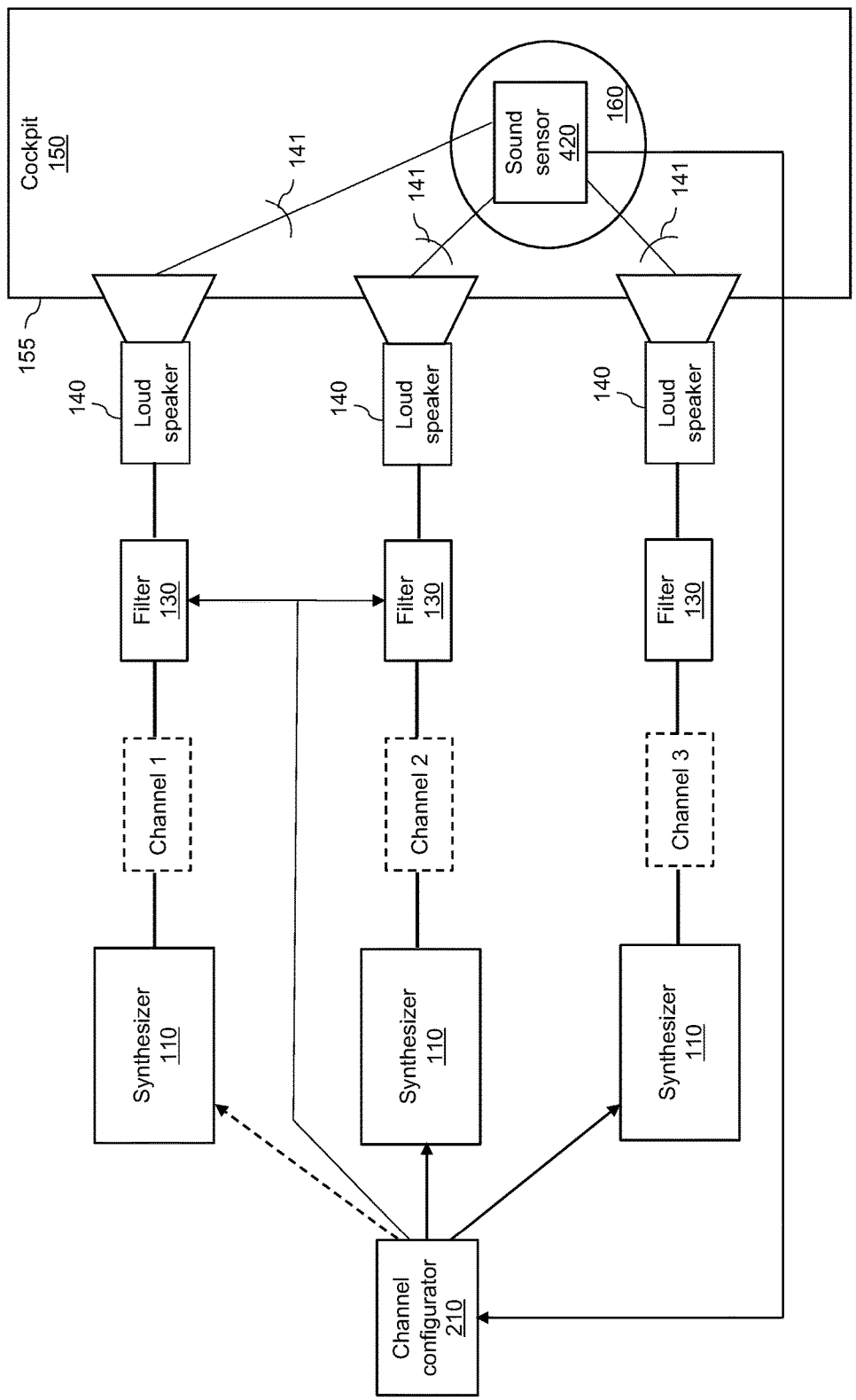
FIGS. 13 and 14 further illustrate a system for dynamically adapting of calibrating multi-channel non-coherent signals.
Figure 14:
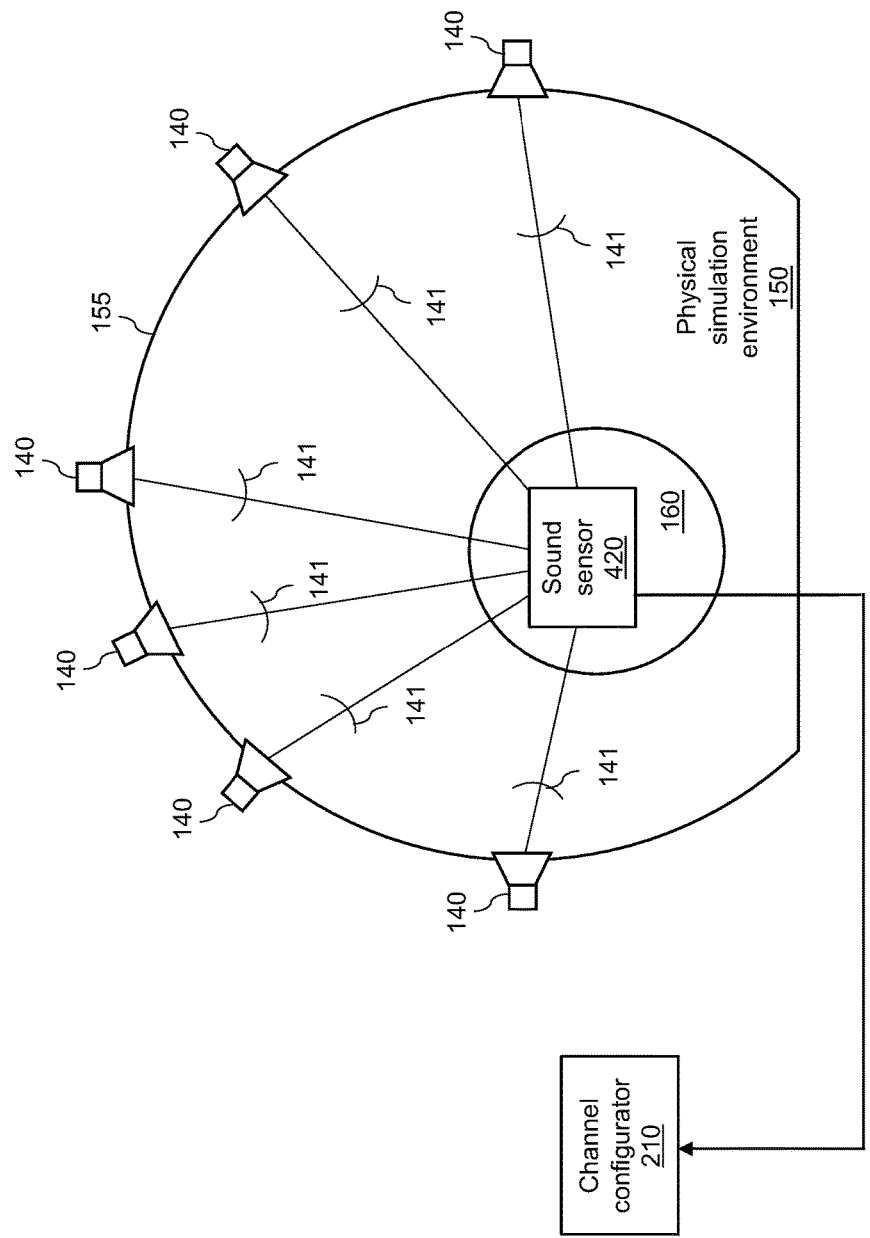

Referring now concurrently to FIGS. 13, 14 and 15, the system 200 further dynamically adapts calibrated multi-channel non-coherent signals.

The channel configurator 210 operates in a manner similar to the channel configurator 210 represented in FIG. 4 for configuring the synthesizers 110 and/or the filters 130.

However, an additional feature is added, consisting in a feedback loop from a sound sensor 420 positioned inside the physical simulation environment 150 to the channel configurator 210. The sound sensor 420 is preferably positioned at position 160 in the physical simulation environment 150, where a user of the simulator is positioned when performing a simulation. Thus, the sound measured by the sound sensor 420 is as close as possible to the sound perceived by the user performing the simulation.

The sound measured by the sound sensor 420 is referred to as the physical simulation environment sound. The physical simulation environment sound comprises the plurality of sound signals 141 respectively played by the plurality of loudspeakers 140. In addition, the physical simulation environment sound also comprises an ambient noise created by components of the physical simulation environment 150. The ambient noise is representative of various factors, including the activity of the user(s) of the simulator, noise created by components of the simulator during operation, etc. The sound sensor 420 measures a physical simulation environment signal amplitude of the physical simulation environment sound, and the ambient noise, and transmits the physical simulation environment signal amplitude and the measured ambient noise to the channel configurator 210.

As mentioned previously, the channel configurator 210 of the system 200 represented in FIG. 4 configures each synthesizer 110 and/or filter 130 to generate a calibrated amplitude spectrum of the signal. The calibrated amplitude spectrum is determined based on a reference amplitude spectrum of the signal and at least one parameter selected among one of the following: a target global signal amplitude, a directionality of the signal when played by the corresponding loudspeaker 140, the ambient noise, the physical simulation environment sound and a frequency response of the synthesizer 110.

The channel configurator 210 of the system 200 represented in FIG. 13 further takes into consideration the feedback loop between the sound sensor 420 and the channel configurator 210. More specifically, the channel configurator 210 determines the calibrated amplitude spectrum of the signal generated by the synthesizer 110, based on the reference amplitude spectrum of the signal and an adjusted global signal amplitude. The adjusted global signal amplitude is calculated (by the channel configurator 210 or the synthesizer 110) based on the target global signal amplitude, the measured physical simulation environment signal amplitude transmitted by the sound sensor 420 and the measured ambient noise measured by the sound sensor 420.

The determination of the calibrated amplitude spectrum of the signal, based on the reference amplitude spectrum of the signal and the adjusted global signal amplitude, is similar to the previously described determination (by the system 200) of the calibrated amplitude spectrum of the signal, based on the reference amplitude spectrum of the signal and the target global signal amplitude (the target global signal amplitude is replaced by the adjusted global signal amplitude for performing the determination).

The target global signal amplitude is a fixed reference value for the global signal amplitude. The target global signal amplitude is determined for allowing the user of the simulator to perform the simulation in the best possible audio conditions when positioned at position 160 in the physical simulation environment 150. The target global signal amplitude is configured at the channel configurator 210.

The physical simulation environment signal amplitude is the signal amplitude of the sound perceived by the user of the simulator positioned at position 160 in the physical simulation environment 150 when performing the simulation. The physical simulation environment signal amplitude may differ from the target global signal amplitude based on the current operating conditions of the system 200.

The ambient noise is the noise perceived by the user of the simulator, and created by the immediate surroundings of the user, such as by electric, hydraulic, pneumatic and mechanic components of the simulator, or in the vicinity of the simulator, either caused by the operation of the simulator or independent of the operation of the simulator.

The adjusted global signal amplitude takes into consideration the difference between the physical simulation environment signal amplitude, the ambient noise signal amplitude, and the target global signal amplitude in the computation of the calibrated amplitude spectrum of the signal generated by the synthesizers 110 and the filters 130, so that the physical simulation environment signal amplitude perceived by the user of the simulator converges towards the target global signal amplitude.

FIG. 15 illustrates an algorithm 500 for calculating the target global signal amplitude. The steps of the algorithm 500 are implemented by the channel configurator 210, except for step 540 which can also be implemented by the synthesizer 110.

At step 510, the stored adjusted global signal amplitude is initialized with the target global signal amplitude. Since no physical simulation environment signal amplitude has been taken into consideration yet, the system 200 is supposed to be functioning in an optimal manner.

At step 520, a new value of the physical simulation environment signal amplitude is received from the sound sensor 420.

At step 525, a measure of the ambient noise signal in the physical simulation environment is received.

At step 530, the adjusted global signal amplitude is calculated by making the sum of the previously stored (at step 510 initially, and then at step 550) adjusted global signal amplitude and the difference between the target global signal amplitude and the received (at step 520) physical simulation environment signal amplitude and the measured ambient noise signal.

At step 540, the calibrated amplitude spectrum of the signal is determined based on the reference amplitude spectrum of the signal and the calculated (at step 530) adjusted target global signal amplitude.

At step 545, the calculated (at step 530) adjusted global signal amplitude is stored for the next iteration.

After step 545, the next iteration of the loop starts at step 520, as illustrated in FIG. 15.

As mentioned previously, the determination of the calibrated amplitude spectrum of the signal based on the reference amplitude spectrum of the signal and the adjusted global signal amplitude may also take into consideration at least one of the following parameters: a directionality of the signal when played by the corresponding loudspeaker 140, and a frequency response of the synthesizer 110.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A system for dynamically adapting calibrated multi-channel non-coherent signals, comprising:
   a physical simulation environment;

a plurality of synthesizers for generating a corresponding plurality of signals;

a plurality of filters for band-pass filtering the plurality of generated signals, each filter filtering the signal generated by one of the plurality of synthesizers, each filter being configured for performing the band-pass filtering in a dedicated frequency band;

a plurality of loudspeakers positioned on a wall of the physical simulation environment for playing the plurality of filtered signals inside the physical simulation environment, each loudspeaker playing the signal filtered by one of the plurality of filters;

a noise sensor positioned inside the physical simulation environment for measuring a physical simulation environment signal amplitude and transmitting the physical simulation environment signal amplitude to a channel configurator; and the channel configurator for configuring each filter to generate the corresponding signal according to a calibrated amplitude spectrum of the signal, the calibrated amplitude spectrum being determined by the synthesizer based on a reference amplitude spectrum of the signal and an adjusted global signal amplitude, the adjusted global signal amplitude being calculated based on a target global signal amplitude and the physical simulation environment signal amplitude.

2. The system of claim 1, wherein the calculated adjusted global signal amplitude is stored by the channel configurator, and the currently calculated adjusted global signal amplitude is equal to the sum of the previously stored adjusted global signal amplitude and the difference between the target global signal amplitude and the physical simulation environment signal amplitude.

3. The system of claim 1, wherein the determination of the calibrated amplitude spectrum of the signal based on the reference amplitude spectrum of the signal and the adjusted global signal amplitude comprises determining a calibrated average amplitude of the calibrated amplitude spectrum based on a reference average amplitude of the reference amplitude spectrum and the adjusted global signal amplitude, the sum of the calibrated average amplitude of the plurality of signals being substantially equal to the adjusted global signal amplitude.

4. The system of claim 1, wherein the determination of the calibrated amplitude spectrum of the signal generated by the synthesizer is further based on at least one of the following: a directionality of the signal when played by the loudspeaker and a frequency response of the synthesizer.

5. The system of claim 1, wherein each generated signal consists of one of the following: a noise signal, a combination of noise signals, a tone signal, a combination of tone signals, and a combination of at least one noise signal and at least one tone signal.

6. The system of claim 1, wherein the plurality of loudspeakers transmits the plurality of played signals to a user of the simulator positioned inside the physical simulation environment, and the noise sensor is positioned in the vicinity of the user.

7. The system of claim 1, wherein the simulator consists of an aircraft simulator and at least one of the plurality of generated signals consists of one of the following: a sound signal corresponding to aerodynamic hiss, a sound signal corresponding to engine noise, a sound signal corresponding to flaps being raised or lowered, a sound signal corresponding to landing gear being deployed or retracted, and a sound signal corresponding to a hydraulic pump being activated.

* * * * *